US009761059B2

(12) United States Patent
Nistel et al.

(10) Patent No.: US 9,761,059 B2
(45) Date of Patent: Sep. 12, 2017

(54) DYNAMIC AUGMENTATION OF A PHYSICAL SCENE

(71) Applicant: INTEL CORPORATION, Santa Clara, CA (US)

(72) Inventors: Kobi Nistel, Haifa (IL); Barak Hurwitz, Kibbutz Alonim (IL); Gila Kamhi, Zichron Yaakov (IL); Dror Reif, Be'er-Yacoov (IL); Vladimir Cooperman, Haifa (IL)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 14/269,782

(22) Filed: May 5, 2014

(65) Prior Publication Data

US 2015/0193986 A1 Jul. 9, 2015

Related U.S. Application Data

(60) Provisional application No. 61/923,589, filed on Jan. 3, 2014.

(51) Int. Cl.
*G06T 19/20* (2011.01)
*G06T 15/04* (2011.01)
(Continued)

(52) U.S. Cl.
CPC .............. *G06T 19/20* (2013.01); *G06T 15/04* (2013.01); *G06T 15/60* (2013.01); *G06T 19/003* (2013.01);
(Continued)

(58) Field of Classification Search
CPC ..... G06T 19/20; G06T 19/003; G06T 19/006; G06T 15/04; G06T 15/60;
(Continued)

(56) References Cited

U.S. PATENT DOCUMENTS 7,394,459 B2 7/2008 Bathiche et al.
8,705,893 B1* 4/2014 Zhang ................ G06K 9/00201
345/418
(Continued)

FOREIGN PATENT DOCUMENTS

KR       10-108083 B1    11/2011
KR  10-2012-0125730 A   11/2012
(Continued)

OTHER PUBLICATIONS

International Search Report and Written Opinion mailed Feb. 24, 2015 for International Application No. PCT/US2014/065764, 11 pages.
(Continued)

*Primary Examiner* — Maurice L McDowell, Jr.
(74) *Attorney, Agent, or Firm* — Schwabe, Williamson & Wyatt, P.C.

(57) ABSTRACT

Computer-readable storage media, computing device and methods associated with dynamic modification of a rendering of a physical scene. In embodiments, one or more computer-readable storage media may have instructions stored thereon which, when executed by a computing device, may provide the computing device with a dynamic augmentation module. The dynamic augmentation module may, in some embodiments, cause the computing device to receive a manipulation of a physical scene. In response to receipt of the manipulation, the dynamic augmentation module may cause the computing device to dynamically modify a rendering of the physical scene. In some embodiments, this may be accomplished through real-time application of one or more virtual articles to the rendering of the physical scene or alteration of one or more virtual articles added to the rendering of the physical scene. Other embodiments may be described and/or claimed.

21 Claims, 7 Drawing Sheets

(51) Int. Cl.
*G06T 15/60* (2006.01)
*G06T 19/00* (2011.01)

(52) U.S. Cl.
CPC .. *G06T 19/006* (2013.01); *G06T 2207/10016* (2013.01); *G06T 2207/10028* (2013.01); *G06T 2215/06* (2013.01); *G06T 2219/2012* (2013.01); *G06T 2219/2021* (2013.01)

(58) Field of Classification Search
CPC ....... G06T 2207/10016; G06T 2215/06; G06T 2219/2021; G06T 2207/10028; G06T 2219/2012
See application file for complete search history.

(56) References Cited

U.S. PATENT DOCUMENTS

| | | | |
|---|---|---|---|
| 8,878,846 B1* | 11/2014 | Francis, Jr. | G06T 19/006 345/420 |
| 2006/0038833 A1 | 2/2006 | Mallinson et al. | |
| 2011/0187746 A1* | 8/2011 | Suto | G06T 19/006 345/634 |
| 2012/0236119 A1 | 9/2012 | Rhee et al. | |
| 2012/0262486 A1 | 10/2012 | Raghoebardajal et al. | |
| 2014/0024453 A1 | 1/2014 | Eberwein et al. | |
| 2014/0028850 A1* | 1/2014 | Keating | G06T 19/006 348/158 |
| 2014/0178029 A1 | 6/2014 | Raheman et al. | |
| 2014/0210710 A1 | 7/2014 | Shin et al. | |
| 2015/0062120 A1* | 3/2015 | Reisner-Kollmann | G06T 7/0042 345/419 |
| 2016/0269622 A1 | 9/2016 | Melnyk et al. | |

FOREIGN PATENT DOCUMENTS

| | | |
|---|---|---|
| KR | 10-1250619 B1 | 4/2013 |
| KR | 10-2014-0098657 A | 8/2014 |

OTHER PUBLICATIONS

International Preliminary Report on Patentability mailed Jul. 14, 2016 for International Application No. PCT/US2014/065764; 8 pages.
International Search Report and Written Opinion mailed Nov. 5, 2015 for International Application No. PCT/US2015/041165, 14 pages.
International Preliminary Report on Patentability mailed Mar. 16, 2017 for International Application No. PCT/US2015/041165, 11 pages.
Office Action dated Apr. 21, 2017 from U.S. Appl. No. 14/475,747, 15 pages.

* cited by examiner

DYNAMIC AUGMENTATION OF A PHYSICAL SCENE

CROSS-REFERENCE TO RELATED APPLICATION

This application claims the benefit of U.S. Provisional Application No. 61/923,589, filed Jan. 3, 2014, entitled "DYNAMIC AUGMENTATION OF PHYSICAL OBJECTS," the entirety of which is incorporated herein by reference.

TECHNICAL FIELD

Embodiments of the present disclosure are related to the field of augmented reality, and in particular, to dynamic augmentation of a physical scene.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Throughout a person's lifetime, the person may relate to both a physical world in which the person lives and a virtual world in which the person may play, learn, work, etc. Augmented reality and mixed reality applications create environments that may blur the limits between virtual and real worlds. Under the current state of the art, however, augmented reality is limited to static physical depictions where, once a physical environment has been augmented, changes in the physical environment are not reflected in the augmentation.

DETAILED DESCRIPTION OF ILLUSTRATIVE EMBODIMENTS

Methods, storage media, and computing device for dynamic augmentation of a physical scene are described herein. In embodiments, a computing device may include a dynamic augmentation module. The dynamic augmentation module may be communicatively coupled with a camera oriented to capture one or more images of a physical scene. The dynamic augmentation module may, in some embodiments, include one or more modules configured to generate a rendering of the physical scene from the one or more images and to detect a manipulation of the physical scene. In some embodiments, detection of manipulation may be based on previously gathered information or previously analyzed images of the physical scene. In response to detecting manipulation of the physical scene, the dynamic augmentation module may dynamically modify the rendering of the physical scene, in real-time, through application of one or more virtual articles to the rendering of the physical scene or alteration of one or more virtual articles added to the rendering of the physical scene, based on the manipulation. For example, a physical object such as a model boat may be added to a physical scene. In response, the dynamic augmentation module may augment a rendering of the physical scene, for example, by applying one or more virtual artifacts such as a virtual skier attached to the model boat. A user may manipulate the physical scene by causing the model boat to physically move. In response to the manipulation, the dynamic augmentation module may cause the virtual skier to move, in real-time, in response to the physical movement of the model boat.

In the following detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

Figure 1:
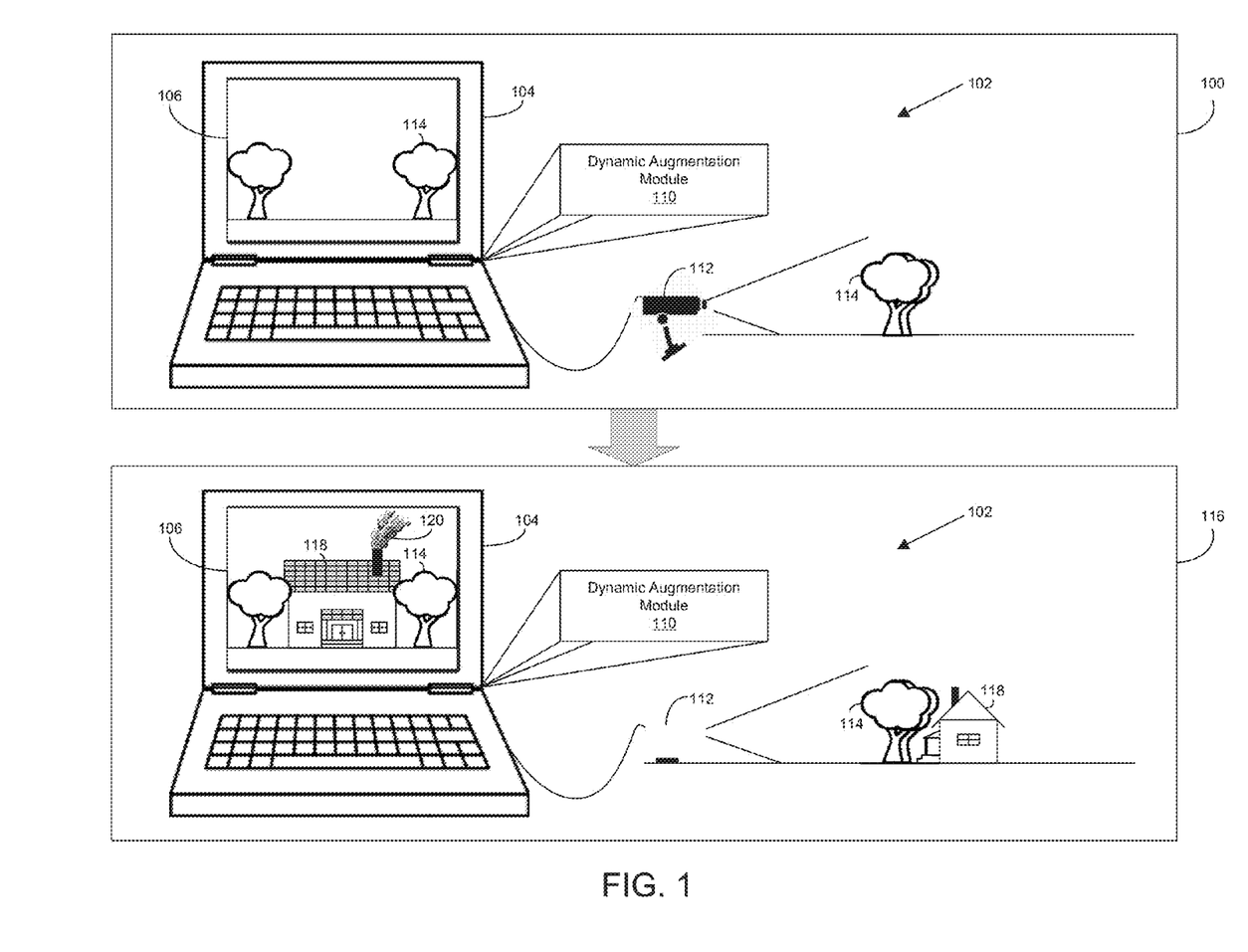
FIG. 1 illustrates a computing environment, in accordance with various embodiments of the present disclosure.

FIG. 1 illustrates a computing environment 102 in accordance with various embodiments of the present disclosure. Computing environment 102, as depicted in box 100, may include computing device 104 which may include display 106 and a dynamic augmentation module 110. Computing environment 102 may further include camera 112 coupled with computing device 104. While depicted herein as being peripherally attached, camera 112 may, in some embodiments, be integrated into computing device 104. In addition, while camera 112 may be depicted as being communicatively coupled with computing device 104 via a wired connection it will be appreciated that any wired or wireless connection suitable for transmitting data captured by a camera may be utilized in communicatively coupling camera 112 with computing device 104. In some embodiments, camera 112 may be configured to capture both depth and color information. For example, in some embodiments, camera 112 may incorporate a depth sensor, such as, an infrared emitter utilized in combination with an infrared camera, as well as a two dimensional (2-D) image capturing sensor, such as a red, green and blue (RGB) camera sensor.

Camera 112 may be disposed in computing environment 102 to capture images/video of a physical scene. The physical scene may include one or more physical objects, such as model trees 114. In embodiments, these images may include both color information and depth information captured by camera 112. Computing device 104 may be configured to receive these captured images from camera 112 and provide the captured images to dynamic augmentation module 110.

Dynamic augmentation module 110 may, in some embodiments, include one or more modules configured to merge the color information and depth information included with the images to create three dimensional (3-D) renderings of the images. Dynamic augmentation module 110 may further include one or more modules configured to analyze the images and recognize predefined physical objects contained in the images. This may be accomplished through a feature extraction and comparison of the extracted features with features of predefined physical objects. In embodiments, the predefined physical objects may be contained in a database of predefined physical objects. These predefined physical objects may, in some embodiments, be defined by a third party, such as a manufacturer or supplier of the physical object. In other embodiments, the pre-defined physical objects may be defined by a user of the computing device.

In some embodiments, dynamic augmentation module 110 may include one or more modules configured to enable a user of computing device 104 to define new physical objects. This may be accomplished by capturing one or more images of the physical object via camera 112. Dynamic augmentation module 110 may include one or more modules configured to extract features associated with the physical object from the one or more images and generate feature data sufficient to identify the physical object in an image of a physical scene. These features may then be stored in a physical object repository to be utilized for identifying the physical object in future physical scenes. In addition, dynamic augmentation module 110 may include one or more modules configured to allow a user to define augmentations, or virtual articles, such as those described herein, to be applied to the physical object.

Once a physical object is recognized, dynamic augmentation module 110 may be configured to augment (through one or more of its modules) the 3-D rendering of the physical object with one or more virtual articles for output on display 106. For example, model trees 114 may be augmented with the addition of one or more virtual birds, squirrels, nuts, fruit, etc., not depicted. In some embodiments, the virtual articles may cause a change to the structure of the physical object depicted on display 106. For instance, if one of the virtual articles were a bird, such as a woodpecker, then one of the virtual articles may be a hole, not depicted, created by the woodpecker in a trunk of the tree depicted on display 106.

Dynamic augmentation module 110 may further include one or more modules configured to dynamically track the location of the physical objects to determine movement of the physical objects and cause the virtual articles to behave in accordance with the movement. This may be considered a type of context based augmentation, where the context may be based on the movement of the physical objects. For instance, if a user were to physically move or rotate one of model trees 114 dynamic augmentation module 110 (through one or more of its modules) may track this movement and adjust the one or more virtual articles rendered on display 106 according to the tracked physical movement. For example, if the rendering of model trees 114 were augmented with virtual articles, such as virtual nuts, and a user physically rotated one of the model trees 114 in the physical scene, dynamic augmentation module 110 (through one or more of its modules) may cause the virtual nuts to rotate in the rendering of the physical scene on display 106, in reference to the rotation of the model tree.

In some embodiments, dynamic augmentation module 110 may include one or more modules configured to aid a user of computing device 104 in the completion of a task, such as assembly of a puzzle, block construction, or other such task. In such embodiments, the predefined physical objects may be portions, or subtasks, of the task, such as individual or partially assembled blocks. In such an embodiment, dynamic augmentation module 110 may be configured to recognize and augment (through one or more of its modules) the subtasks of the task to aid the user in completing the task. This may be considered another type of context based augmentation where the individual subtasks are predefined physical objects that, when recognized by dynamic augmentation module 110, may be augmented based on a context associated with one or more other predefined physical objects of the scene that make up one or more of the other subtasks. This task/subtask context is discussed further in reference to FIG. 5, below.

Dynamic augmentation module 110 may include one or more modules configured to not only augment the rendering of the physical objects with virtual articles, but may also diminish the rendering of the physical objects. For example, dynamic augmentation module 110 may include one or more modules configured, in some embodiments, to depict/render model trees 114 as being on fire, as depicted below in FIG. 3. In such an example, dynamic augmentation module 110 may include one or more modules configured to reduce and char the rendering, on display 106, of the model trees 114 to reflect virtual consumption of the model trees 114 by the virtual flames of the fire. As used herein, augmentation of the rendering of a physical object, may include diminution of the rendering of the physical object, unless clearly indicated otherwise.

In embodiments, dynamic augmentation module 110 may include one or more modules configured to allow a user to interact with the virtual articles through interaction with the depiction on display 106 via one or more input components of computing device 104. For example, the user may be able to change the color or type of tree rendered on display 106 by adjusting one or more settings associated with the model trees 114.

In some embodiments, dynamic augmentation module 110 may include one or more modules configured to enable the user to interact with the depiction on display 106 through physical interaction with the physical objects of the physical scene. For example, as depicted in box 116, the user has added a model house 118 to the physical scene. Dynamic augmentation module 110 has dynamically integrated (through one or more of its modules) a rendering of model house 118 into the depiction of the physical scene on display 106. In addition, dynamic augmentation module 110 may include one or more modules configured to recognize the physical object as a house and may augment the rendering of model house 118 on display 106 with a virtual article, such as, virtual smoke 120 emanating from a chimney of the house. In some embodiments, dynamic augmentation module 110 may be further configured to enable a user to interact with one or more of the virtual articles through physical manipulation of the physical scene. For example, if a user were to physically swipe the user's hand over the chimney of the model house 118, dynamic augmentation module 110 may include one or more modules configured to depict the user's hand interacting with and displacing the virtual smoke 120 depicted on display 106.

It will be appreciated that the above examples are meant for purposes of illustration and should not be viewed as limiting of this disclosure. Furthermore, while computing device 104 is depicted herein as a laptop computer, it will be appreciated that this is also merely for illustrative purposes. Computing device 104 may take the form of any type of portable or stationary computing device, such as, but not limited to, a smart phone, tablet, laptop, desktop, kiosk, or wearable computing devices such as, for example, Google Glass. Any computing device capable of carrying out the processes described herein is contemplated by this disclosure.

Figure 2:
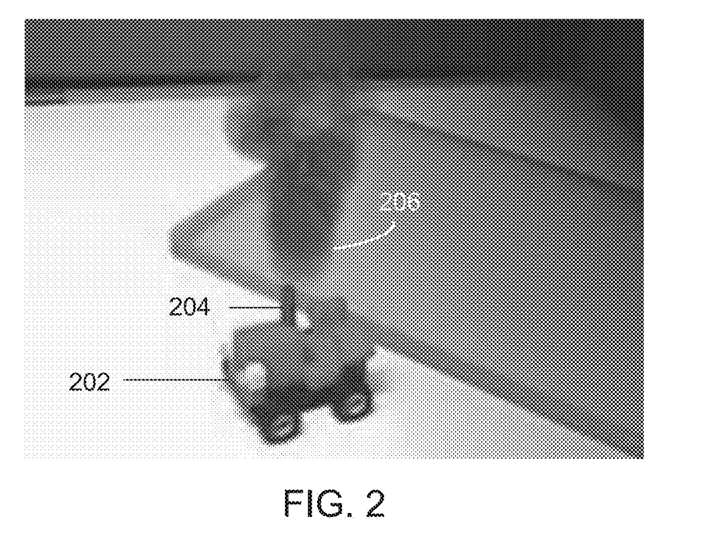
FIG. 2 is an illustrative depiction of a dynamically augmented physical object, in accordance with various embodiments of the present disclosure.

FIG. 2 is an illustrative depiction of a dynamically augmented rendering of a physical object, in accordance with various embodiments of the present disclosure. In this depiction, the rendering of a tractor 202 is augmented with virtual smoke 206 emanating from an exhaust 204 of tractor 202. This augmentation may be accomplished utilizing a dynamic augmentation module, such as dynamic augmentation module 110 of FIG. 1. Furthermore, as discussed above, a user may be able to interact with the depiction by interacting with the physical objects. For example, if a user were to physically push tractor 202 around, the dynamic augmentation module may cause the virtual smoke 206 to move with the tractor in the rendering of the physical scene, and may also reflect any dispersion of the augmented smoke such movement may cause in the rendering of the physical scene.

Figure 3:
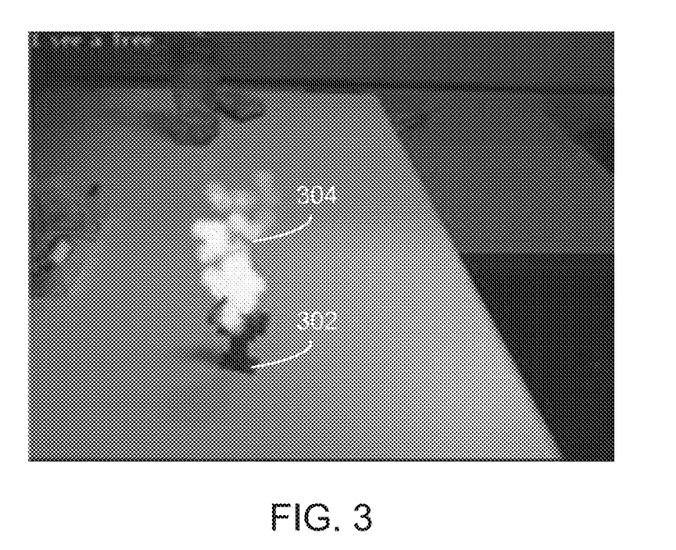
FIG. 3 is an illustrative depiction of dynamically diminished reality, in accordance with various embodiments of the present disclosure.

FIG. 3 is an illustrative depiction of a dynamically diminished reality, in accordance with various embodiments of the present disclosure. In this depiction, the rendering of a tree 302 is augmented with virtual fire 304 consuming the rendered tree 302. This augmentation may be accomplished utilizing a dynamic augmentation module, such as dynamic augmentation module 110 of FIG. 1. Furthermore, as discussed above, a user may be able to interact with the depiction by physically interacting with the physical objects of the physical scene. For example, a user may be able to place a model fire truck, not depicted, in the physical scene. The model fire truck may be recognized by the dynamic augmentation module, for example through feature extraction as discussed elsewhere herein, and the rendering of the model fire truck may be augmented by the dynamic augmentation module with virtual firemen and/or a virtual hose. In some embodiments, a user may be able to physically position the model fire truck in the physical scene to cause the virtual firemen or the virtual hose, of the rendering of the physical scene, to extinguish virtual fire 304. In some embodiments, if the rendered tree 302 were left virtually burning for long enough it may be completely consumed by the virtual fire and, as a result, may be removed from the rendering of the physical scene, although it may still be present in the actual physical scene itself.

Figure 4:
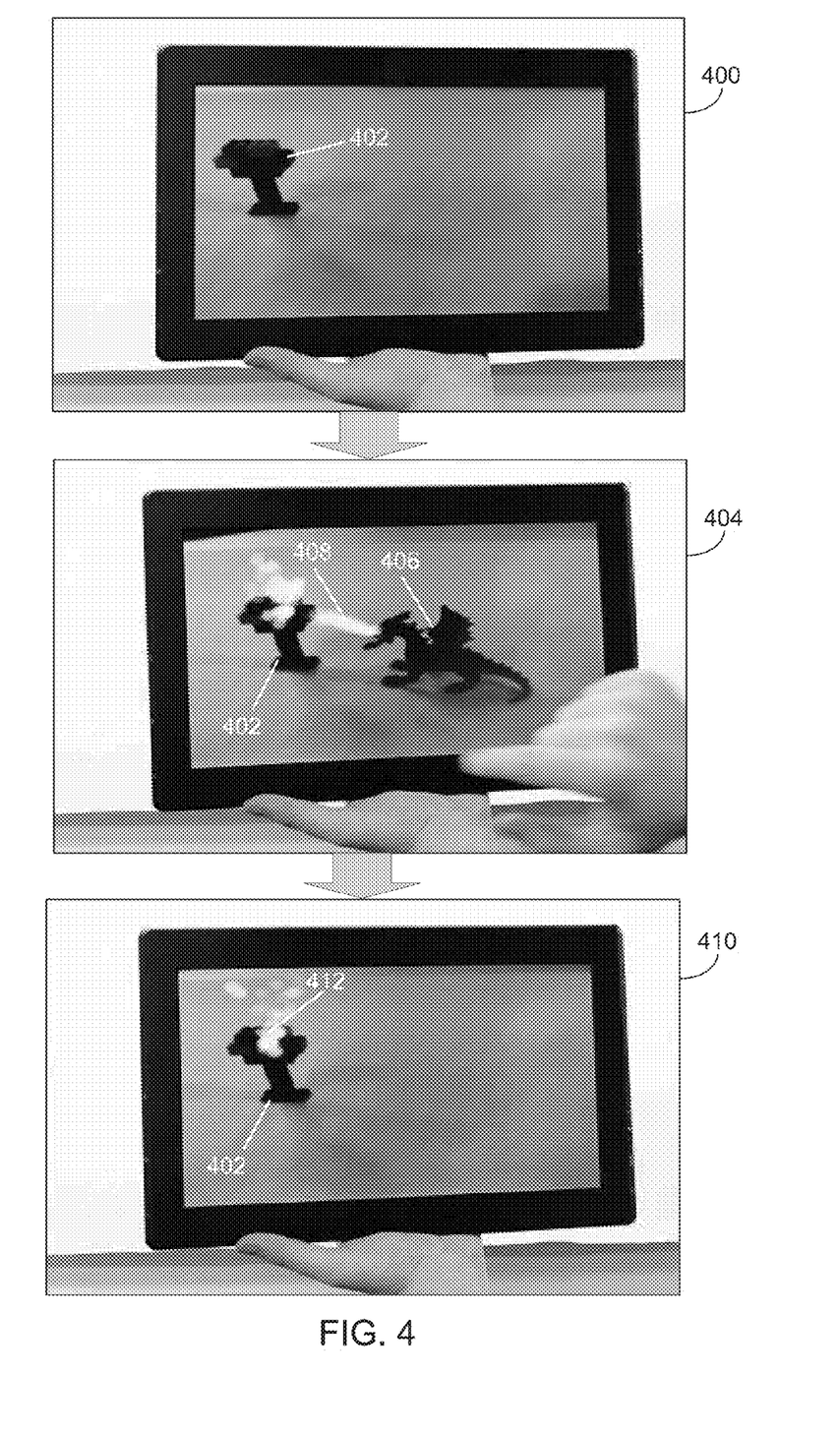
FIG. 4 is an illustrative depiction of an augmentation sequence depicting a dynamic augmentation, in accordance with various embodiments of the present disclosure.

FIG. 4 is an illustrative depiction of an augmentation sequence depicting a dynamic augmentation of a rendering of a physical scene on a tablet, in accordance with various embodiments of the present disclosure. Although depicted here as a tablet, in various embodiments, the augmentations depicted in FIG. 4 may be accomplished utilizing any computing device described herein, such as computing device 104 of FIG. 1 or computing device 900 of FIG. 9 wherein a dynamic augmentation module, such as that described in reference to FIG. 1 or 9, may perform the physical object recognition, tracking, and dynamic augmentation. The sequence may begin at 400 where a rendering of a physical scene is depicted on the tablet. The physical scene may have a model tree 402 disposed therein. At 404 a model dragon 406 may be added to the physical scene and this may be correspondingly reflected in the rendering of the physical scene on the tablet. Model dragon 406 may be a predefined physical object which may be recognized by the dynamic augmentation module through physical object recognition, such as that described herein, and the rendering of the model dragon 406 may be dynamically augmented by the dynamic augmentation module with a virtual flame 408 coming from a mouth of model dragon 406 in the rendering on the tablet at 404. As depicted, the mouth of the model dragon 406 may be directed at tree 402 of the physical scene. Correspondingly, virtual flame 408, depicted in the augmented rendering of the physical scene at 404, may be directed at the rendering of tree 402. At 410, model dragon 406 may be removed from the physical scene and consequently model dragon 406 and virtual flame 408 may be removed from the rendering of the physical scene on that tablet, however, the rendering of tree 402 may be dynamically augmented with a new virtual flame 412 based on the context of virtual flame 408 having been previously applied to the rendering of tree 402.

Figure 5:
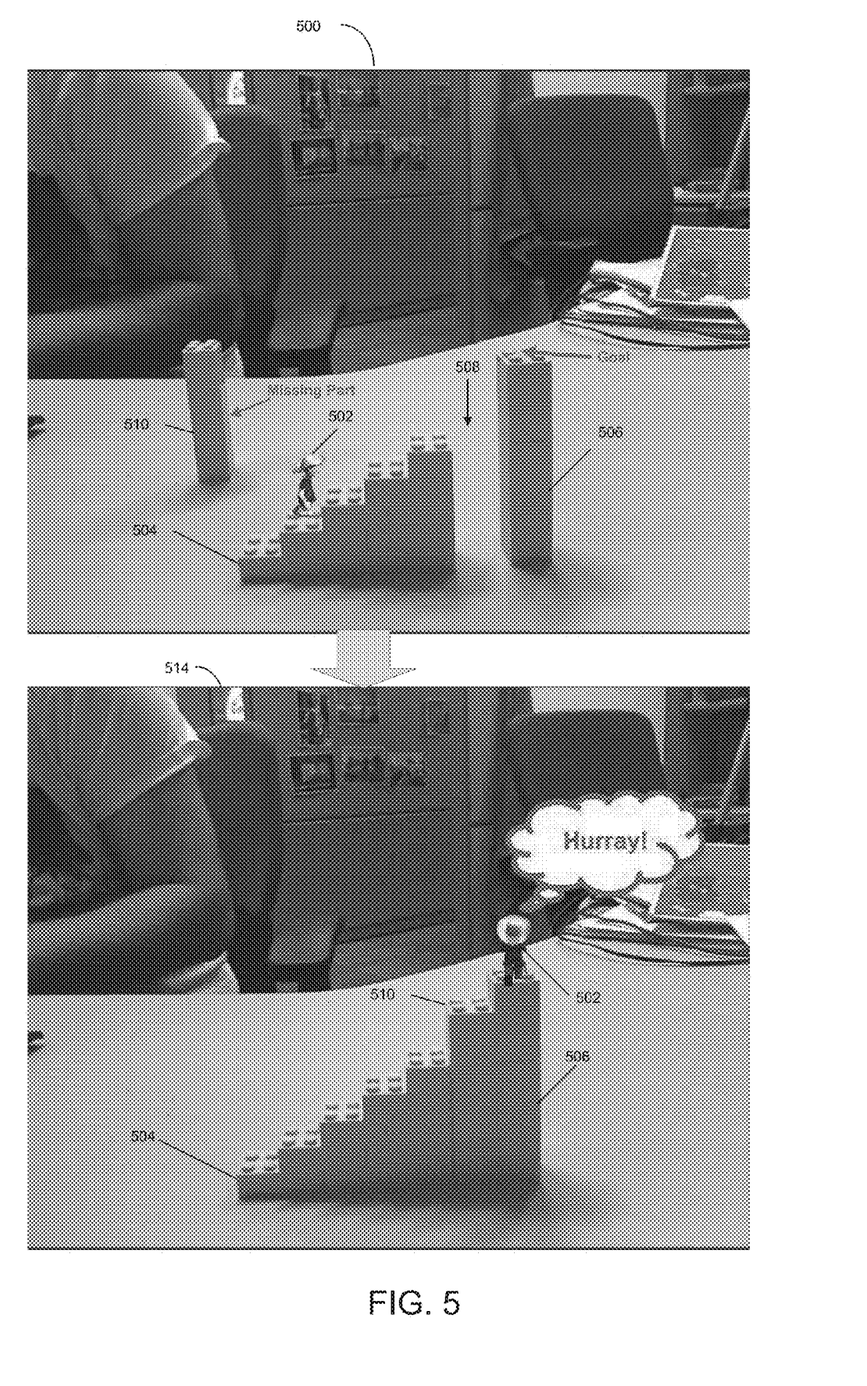
FIG. 5 is an illustrative depiction of physical objects that have been dynamically augmented to complete a task, in accordance with various embodiments of the present disclosure.

FIG. 5 is an illustrative depiction of physical objects that have been dynamically augmented based on a task/subtask context to complete a task and achieve a goal, in accordance with various embodiments of the present disclosure. In embodiments, the augmentations depicted in FIG. 5 may be accomplished utilizing a computing device such as computing device 104 of FIG. 1 wherein dynamic augmentation module 110 of FIG. 1 or 9 may perform the physical object recognition, tracking, and dynamic augmentation via, for example, the processes discussed in reference to FIG. 7 or 8. Depiction 500 illustrates two portions of a block structure, a beginning structure 504 and an end structure 506, having gap 508 separating the two portions of the block structure. The task here may be for a user to complete the structure and, in so doing, enable an augmented character 502 to arrive at the goal. To aid the user in completing this task, the image may be augmented to identify missing part 510 and the goal for the user. In depiction 514 the user may place the previously augmented missing part into gap 508 to complete the desired structure. The placement of the missing part may be tracked via the computing device to enable the computing device to monitor for completion of the task, or desired structure. Once completed, augmented character 502 may traverse the structure to arrive at the goal and, upon arrival, an augmentation may be added to announce the successful completion of the desired structure, such as that depicted in 514.

Figure 6:
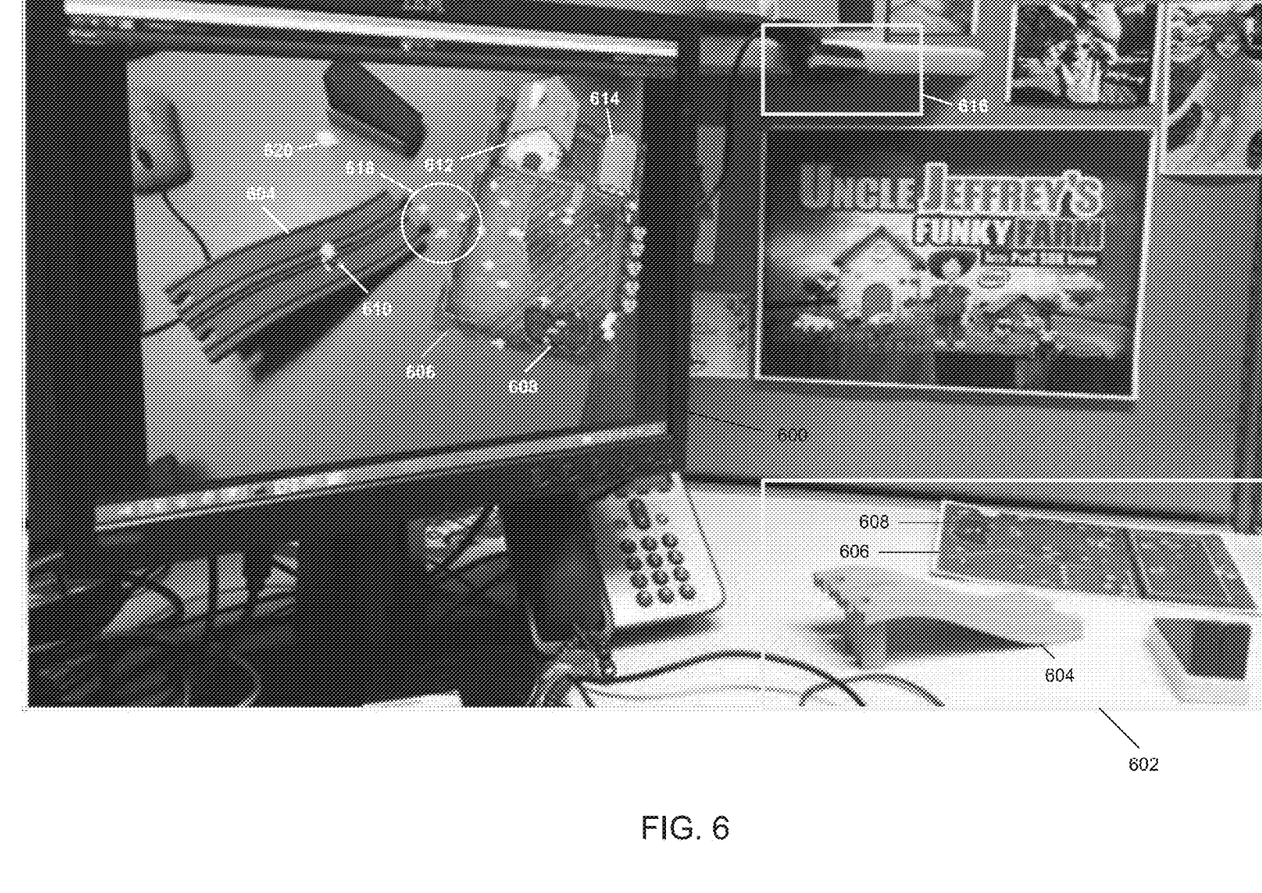
FIG. 6 is another illustrative depiction of dynamically augmented physical objects, in accordance with various embodiments of the present disclosure.

FIG. 6 is another illustrative depiction of a computing environment for dynamically augmenting physical objects, in accordance with various embodiments of the present disclosure. The computing environment may comprise monitor 600, camera 616, and physical scene 602. The object recognition, dynamic augmentations and the dynamic augmentations interactions with the renderings of physical objects of physical scene 602 may be accomplished utilizing a dynamic augmentation module, such as dynamic augmentation module 110 of FIG. 1. Physical scene 602 may have predefined physical objects, such as bridge 604 and a book 606 containing farm layout 608. As can be seen by the rendering of physical scene 602 displayed on monitor 600, the rendering of the physical scene may be augmented by the dynamic augmentation module based upon recognition, by the dynamic augmentation module, of one or more predefined physical objects. One such augmentation is represented by virtual character 610. In embodiments, the augmentations may be aware of the rendered physical objects in the rendered physical scene. This is demonstrated through the traversal, by virtual character 610, of the rendering of bridge 604 depicted on display 600. As depicted, the rendering of farm layout 606 on display 600 may be augmented with virtual buildings 612 and 614. In addition, the rendering may be augmented with a number of appropriate virtual animals, such as virtual birds 618 and virtual farm animal 620. All of these augmentations may combine to make book 606 appear to come to life for a user of the computing environment.

In embodiments, the user may be able to interact with the physical scene 602 and have those interactions reflected in real time in the rendering of the physical scene on monitor 600. For example, the user may physically pick up and move bridge 604 in physical scene 602. The movement of bridge 604 may be reflected in the rendering of bridge 604 and augmentations applied thereto, by the dynamic augmentation module. For example, virtual character 610 may sway or lose his balance based on the movement. In addition, the movement of bridge 604 in the physical scene 602 may be reflected in virtual articles rendered on display 600 that may be in the path of the rendering of bridge 604. For example, if bridge 604 is moved such that the rendering of bridge 604 moves towards virtual animal 620, the dynamic augmentation module may be configured to cause virtual animal 620 may move out of the way.

Figure 7:
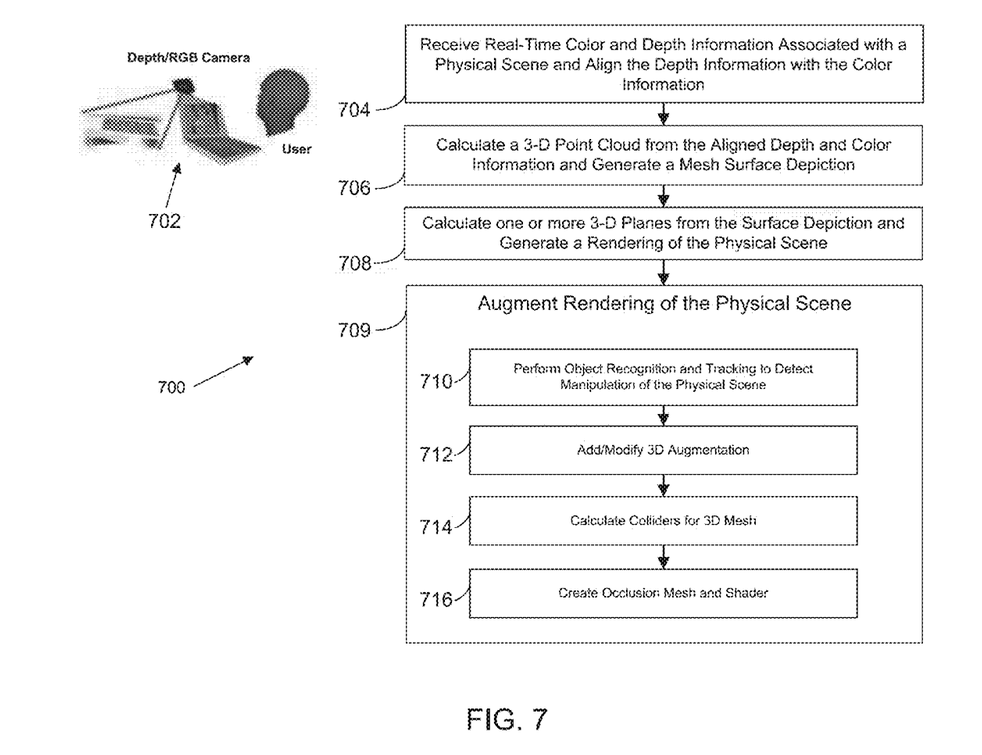
FIG. 7 illustrates an example process flow for dynamic augmentation or dynamic diminished reality, in accordance with various embodiments of the present disclosure.

FIG. 7 illustrates an example process flow 700 for dynamic augmentation, or dynamic diminished reality, in accordance with various embodiments of the present disclosure. The process may be carried out on computing environment 702. In embodiments, computing environment 702 may include a dynamic augmentation module, such as dynamic augmentation module 110 of FIGS. 1 and 9 configured to carry out process 700. Process 700 may begin at block 704 where real time color information and depth information associated with a physical scene being rendered in computing environment 702 may be received. In embodiments, this color and depth information may take the form of images, such as the depth image and RGB image depicted in block 704 of FIG. 7. Such images may, for example, be captured by a camera of computing environment 702. In such embodiments, the depth image and RGB image may be received and aligned by an image processing module associated with the dynamic augmentation module, such as image processing module 916 of FIG. 9.

Figure 9:
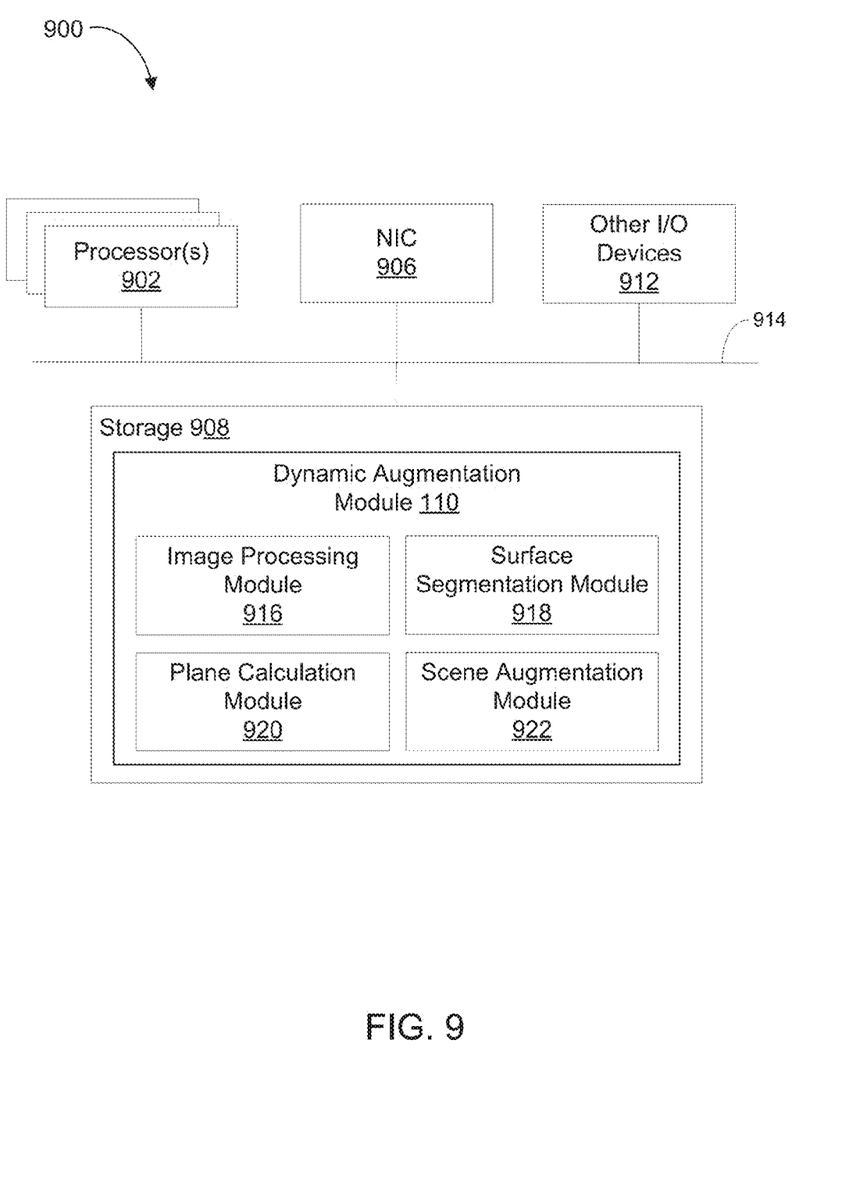
FIG. 9 is a schematic illustration of an example computing device, in accordance with various embodiments of the present disclosure.

In block 706 a surface segmentation module associated with the dynamic augmentation module, such as surface segmentation module 918 of FIG. 9, may receive the aligned images from the image processing module and may calculate a 3-D point cloud from the aligned images. This 3-D point cloud may be utilized by the surface segmentation module to create a 3-D mesh, such as a polygon mesh, triangle mesh, or any other such 3-D surface depiction. In block 708, a plane calculation module associated with the dynamic augmentation module, such as plane calculation module 920 of FIG. 9, may utilize the 3-D surface depiction to calculate one or more 3-D planes of the physical scene, e.g., table top, floor and wall(s), etc. In some embodiments, the one or more 3D planes may be calculated by the plane calculation module based on either marker based (e.g., Simultaneous Location and Mapping (SLAM)) or markerless detection. Alternatively, both techniques may be utilized by the plane calculation module to calculate 3-D plane information. The calculated 3-D planes and 3-D mesh may be utilized to generate a 3-D rendering of the physical scene.

In block 709, a scene augmentation module associated with the dynamic augmentation module, such as scene augmentation module 922, may augment the rendering of the physical scene. Scene augmentation module 922 may perform an object recognition and tracking process to detect manipulations of the physical scene, block 710. An example object recognition and tracking process is described in greater detail in reference to FIG. 8, below. In block 712 the 3-D depth processing may be leveraged by the scene augmentation module to augment, or modify, the rendering of the virtual scene with the application of one or more virtual artifacts to the rendering of the physical scene and/or alteration of one or more virtual artifacts of the rendering of the physical scene.

In some embodiments, the application and/or alteration of the one or more virtual artifacts may be based upon one or more predefined physical objects identified through the object recognition process performed in block 710 or a context associated with a predefined physical objects. In some embodiments, the context associated with a predefined physical object may be based on a previous location of the predefined physical object. For example, the previous location of the predefined physical object may indicate movement of the predefined physical object with respect to the physical scene. In such an example, the alteration of one or more virtual articles may be based on the indicated movement. In other embodiments, the context may be based on another predefined physical object identified within the rendering of the physical scene. An example of this context is demonstrated in both FIGS. 4 and 5, above. In 404 of FIG. 4, a virtual article of fire 408 is applied to tree 402 based upon model dragon 406, model dragon 406 would be the other predefined physical object. In FIG. 5 the subtasks of the task are augmented with virtual articles with respect to the location of the other subtasks. In such an example, each individual subtask is a predefined physical object and the task itself would also represent a predefined physical object. Each of the subtasks of the task has virtual articles applied to them based upon the other subtasks. In still other embodiments, the context may be based upon one or more virtual articles previously applied to the physical object or the physical scene. An example of this is illustrated in 410 of FIG. 4, where tree 402 has flame 412 applied to it as a result of flame 408 having been previously applied.

In block 714 colliders for the 3-D mesh may be calculated by the scene augmentation module to enable the virtual artifacts to walk or move and surfaces of the virtual artifacts to collide with surfaces of physical objects of the rendering of the physical scene. In block 716 an occlusion mesh and shader may be calculated by the scene augmentation module to accurately represent occlusion of physical objects of the rendering of the physical scene by virtual artifacts of the augmentation. In some embodiments, augmentation of the rendering of the physical scene by the scene augmentation module may include diminished reality of the physical scene, such as the diminished reality discussed above in reference to FIGS. 3 and 4.

Figure 8:
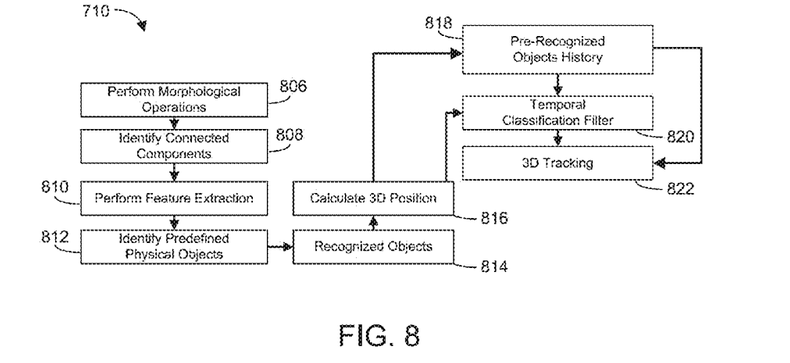
FIG. 8 illustrates a more detailed process flow for some of the processes depicted in FIG. 7, in accordance with various embodiments of the present disclosure.

FIG. 8 illustrates a more detailed process flow concerning an example 3-D object recognition and tracking process of block 710 of FIG. 7, in accordance with various embodiments of the present disclosure. In embodiments, one or more portions of this process may be carried out by a scene augmentation module, such as that of described in FIG. 7 or 9.

In block 806 morphological operations may be carried out by scene augmentation module to clean and filter noise generated by any preceding operations, such as operations 704-708 described above in reference to FIG. 7. Morphological operations may, in some embodiments, also condition data for further processing, for example, by conforming the data to a specified format. In block 808 connected components may be identified by the scene augmentation module as candidate objects to be tracked and/or recognized. This process may be accomplished, for example, by analyzing a plurality of surfaces of the rendering of the physical scene to identify components, or surfaces, of the rendering of the physical scene that have connected continuity indicating that the components are part of a single physical object. In block 810 features of the identified candidate physical objects may be extracted by the scene augmentation module to identify any of the candidate physical objects as predefined physical objects. In block 812, the extracted features for each candidate physical object may be compared by the scene augmentation module against known physical objects, e.g., via a physical object database, to classify, or recognize, the candidate physical object as a predefined physical object. In block 814 the scene augmentation module may add any recognized predefined physical objects to a group of recognized physical objects. In block 816 scene augmentation module may calculate the 3-D position in the rendering of the physical scene of any recognized predefined physical objects. At block 818 the scene augmentation module may add the calculated 3-D position of any recognized physical object to a pre-recognized objects history. At block 820 a temporal classification filter may be utilized by dynamic augmentation module to check that the classification performed in block 812 is consistent over time based, in part, upon the calculated 3-D position of any recognized physical objects. This may be accomplished, for example, utilizing data from pre-recognized objects history of block 818. At block 822, manipulation of the physical scene may be identified, via movement of the recognized physical object within the physical scene or addition of the physical object to the physical scene, by scene augmentation module through the utilization of the 3-D position calculation of block 816 along with any previous location data obtained by the scene augmentation module from the pre-recognized objects history.

FIG. 9 is a schematic illustration of computing device 104 of FIG. 1, in accordance with various embodiments of the present disclosure. As shown, computing device 900 may include one or more processors or processor cores 902, network interface card (NIC) 906, storage 908 (such as diskette, hard drive, compact disc read only memory (CD-ROM) and so forth), and other I/O devices 912 (such as camera 112 of FIG. 1, display 106 of FIG. 1, keyboard, mouse, touchpad and so forth).

Each of these elements may perform its conventional functions known in the art. In particular, storage 908 may be employed to store a working copy and a permanent copy of the programming instructions implementing the operations associated with carrying out the processes or procedures described above in reference to FIGS. 2-8, e.g., dynamic augmentation module 110. Dynamic augmentation module 110 may include an image processing module 916, surface segmentation module 918, plane calculation module 920 and scene augmentation module 922. Each of these modules may perform the respective processes described above in reference to FIGS. 7 and 8. While depicted herein as a collection of four modules, it will be appreciated that dynamic augmentation module 110 may comprise any number of modules for carrying out the procedures described herein. In some embodiments, dynamic augmentation module 110 may have no clearly delineated internal modules, while in other embodiments, dynamic augmentation module 110 may have additional modules and that may perform the processes described above in reference to FIGS. 7 and 8 in a more granular manner. The number of modules should not be viewed as being limiting of this disclosure. The various elements or modules may be implemented by assembler instructions supported by processor(s) 902 or high-level languages, such as, for example, C, that can be compiled into such instructions. In other embodiments, the entirety or portions of dynamic augmentation module 110 may be implemented in hardware.

For software implementations, the permanent copy of the programming instructions of dynamic augmentation module 110 may be placed into storage 908 in the factory, or in the field, through, for example, a distribution medium, such as a compact disc (CD), or through a remote computing device via NIC 906. That is, one or more distribution media having an implementation of the instructions for carrying out the processes or procedures described above in reference to FIGS. 2-8 may be employed to distribute the instructions and program various computing devices.

The number, capability and/or capacity of these elements 902-912 may vary, depending upon the requirements. Their constitutions are otherwise known, and accordingly will not be further described. While depicted herein as a physical computer implementation, this disclosure should not be so limited and, it will be appreciated that, the computer implementation may be a virtual computer implementation as well.

Embodiments of the disclosure can take the form of an entirely hardware embodiment, an entirely software embodiment or an embodiment containing both hardware and software elements. In various embodiments, software, may include, but is not limited to, firmware, resident software, microcode, and the like. Furthermore, the disclosure can take the form of a computer program product accessible from a computer-usable or computer-readable medium providing program code for use by or in connection with a computer or any instruction execution system. As used herein, module may refer to a software module, a hardware module, or any number or combination thereof.

As used herein, the term module includes logic that may be implemented in a hardware component or device, software or firmware that may be run or running on a processor, or a combination of processors. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

For the purposes of this description, a computer-usable or computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Thus, a novel approach based on a combination of 3-D, depth, and/or color (RGB) based real time 3-D physical objection recognition to augment physical scene has been described. Its usage may include, but is not limited to a physical scene with real time physical objects that a user owns or builds, and observes real time relevant augmentation on the scene. The usage may motivate, e.g., goal driven learning, once a physical (such as, construction) goal has been achieved and recognized, relevant digital augmentation kicks off and motivates the user to work harder to get to this stage and observe the surprising magical augmentation.

EXAMPLES

Some non-limiting examples are:

Example 1 is one or more computer-readable storage media having instructions for dynamically modifying a rendering of a physical scene stored thereon which, when executed by a computing device, provide the computing device with a dynamic augmentation module to receive a manipulation of a physical scene, and in response to the receipt, dynamically modify a rendering of the physical scene, through real-time application of one or more virtual articles to the rendering of the physical scene or alteration of one or more virtual articles added to the rendering of the physical scene.

Example 2 may include the subject matter of Example 1, wherein the one or more virtual articles augment or diminish at least a portion of the rendering of the physical scene.

Example 3 may include the subject matter of Example 1, wherein the manipulation of the physical scene comprises addition of a predefined physical object, and wherein to dynamically modify the rendering of the physical scene comprises application of one or more virtual articles to the rendering of the physical scene based upon the predefined physical object.

Example 4 may include the subject matter of any one of Examples 1-3, wherein to dynamically modify the rendering of the physical scene the dynamic augmentation module is further to: receive color information and depth information associated with the physical scene; generate a three dimensional (3-D) rendering of the physical scene from the color and depth information; identify a predefined physical object within the 3-D rendering of the physical scene; and apply one or more virtual articles to the 3-D rendering of the physical scene or alter one or more virtual articles added to the 3-D rendering of the physical scene, based on the identified predefined physical object.

Example 5 may include the subject matter of Example 4, wherein the color information is contained within a color image of the physical scene and the depth information is contained within a depth image of the physical scene.

Example 6 may include the subject matter of Example 5, wherein to identify the predefined physical object, the dynamic augmentation module is further to: analyze a plurality of surfaces within the physical scene utilizing the color image and the depth image to determine components of the physical scene that have connected continuity indicative of the components being a part of a single physical object; extract features of the single physical object for comparison against known features of a plurality of predefined physical objects; and compare the extracted features with features of the plurality of predefined physical objects to identify the single physical object as one of the plurality of predefined physical objects.

Example 7 may include the subject matter of Example 5, wherein the features of the plurality of predefined physical objects are contained in a database of predefined objects.

Example 8 may include the subject matter of Example 5, wherein one or more of the plurality of predefined objects are user defined physical objects.

Example 9 may include the subject matter of Example 5, wherein one or more of the plurality of predefined objects are defined by a third party.

Example 10 may include the subject matter of Example 5, wherein the dynamic augmentation module is further to enable a user of the computing device to define new physical objects to be added to the plurality of predefined physical objects.

Example 11 may include the subject matter of Example 4, wherein to apply or alter one or more virtual articles is further based on a context associated with the predefined physical object.

Example 12 may include the subject matter of Example 11, wherein the context associated with the predefined physical object corresponds with one or more of: a previous location of the predefined physical object; another predefined physical object within the physical scene; or one or more virtual articles previously applied to the physical object or the physical scene.

Example 13 may include the subject matter of Example 12, wherein the context associated with the predefined physical object corresponds with a previous location of the predefined physical object indicating movement, with respect to the physical scene, of the predefined physical object, and wherein to dynamically modify the 3-D rendering of the physical scene is to modify one or more virtual articles based on the indicated movement.

Example 14 may include the subject matter of Example 13, wherein the context associated with the predefined physical object corresponds with another predefined physical object within the physical scene, and wherein to dynamically modify the 3-D rendering of the physical scene is to modify one or more virtual articles based on the another predefined physical object.

Example 15 may include the subject matter of Example 14, wherein the predefined physical object and the another predefined physical object are sub-tasks of a task to be completed by a user of the computing device, and wherein to dynamically modify the physical scene is to augment the physical scene to aid the user in completing the task.

Example 16 is a computing device for dynamic modification of a rendering of a physical scene comprising: a display to render a physical scene; a plane calculation module coupled with the display to generate a rendering of the physical scene; and a scene augmentation module coupled with the display to: detect a manipulation of the physical scene; and dynamically modify the rendering of the physical scene, through real-time application of one or more virtual articles to the rendering of the physical scene or alteration of one or more virtual articles added to the rendering of the physical scene, based on the manipulation.

Example 17 may include the subject matter of Example 16, wherein the one or more virtual articles augment or diminish at least a portion of the rendering of the physical scene.

Example 18 may include the subject matter of Example 16, wherein the manipulation of the physical scene comprises addition of a predefined physical object, and wherein to dynamically modify the rendering of the physical scene comprises application of one or more virtual articles to the rendering of the physical scene based upon the predefined physical object.

Example 19 may include the subject matter of any one of Examples 16-18, wherein the rendering of the physical scene is a three dimensional (3-D) rendering; and wherein to dynamically modify the rendering of the physical scene further comprises: identification of a predefined physical object within the 3-D rendering of the physical scene; and application of one or more virtual articles to the 3-D rendering of the physical scene or alter one or more virtual articles added to the 3-D rendering of the physical scene, based on the identified predefined physical object.

Example 20 may include the subject matter of Example 19, wherein the color information is contained within a color image of the physical scene and the depth information is contained within a depth image of the physical scene and wherein the computing device further comprises an image processing module, coupled with the scene augmentation module, to align the color and depth information for further processing.

Example 21 may include the subject matter of Example 20, wherein to identify the predefined physical object, the scene augmentation module is further to: analyze a plurality of surfaces within the rendering of the physical scene to determine surfaces of the rendering of the physical scene that have connected continuity indicative of the surfaces being a part of a single physical object; extract features of the single physical object for comparison against known features of a plurality of predefined physical objects; and compare the extracted features with features of the plurality of predefined physical objects to identify the single physical object as one of the plurality of predefined physical objects.

Example 22 may include the subject matter of Example 21, wherein the features of the plurality of predefined physical objects are contained in a database of predefined objects.

Example 23 may include the subject matter of Example 21, wherein one or more of the plurality of predefined objects are user defined physical objects.

Example 24 may include the subject matter of Example 21, wherein one or more of the plurality of predefined objects are defined by a third party.

Example 25 may include the subject matter of Example 21, wherein the scene augmentation module is further to enable a user of the computing device to define new physical objects to be added to the plurality of predefined physical objects.

Example 26 may include the subject matter of Example 19, wherein to apply or alter one or more virtual articles is further based on a context associated with the predefined physical object.

Example 27 may include the subject matter of Example 26, wherein the context associated with the predefined physical object corresponds with one or more of: a previous location of the predefined physical object; another predefined physical object within the physical scene; or one or more virtual articles previously applied to the physical object or the physical scene.

Example 28 may include the subject matter of Example 27, wherein the context associated with the predefined physical object corresponds with a previous location of the predefined physical object indicating movement, with respect to the physical scene, of the predefined physical object, and wherein to dynamically modify the 3-D rendering of the physical scene is to modify one or more virtual articles based on the indicated movement.

Example 29 may include the subject matter of Example 28, wherein the context associated with the predefined physical object corresponds with another predefined physical object within the physical scene, and wherein to dynamically modify the 3-D rendering of the physical scene is to modify one or more virtual articles based on the another predefined physical object.

Example 30 may include the subject matter of Example 29, wherein the predefined physical object and the another predefined physical object are sub-tasks of a task to be completed by a user of the computing device, and wherein to dynamically modify the physical scene is to augment the physical scene to aid the user in completing the task.

Example 31 is a computer implemented method for dynamically modifying a rendering of a physical scene comprising: detecting, by a computing device, a manipulation of the physical scene from one or more images of the physical scene; and dynamically modifying, by the computing device, the rendering of the physical scene, by applying one or more virtual articles to the rendering of the physical scene or altering one or more virtual articles added to the rendering of the physical scene, based on the manipulation.

Example 32 may include the subject matter of Example 31, wherein the one or more virtual articles augment or diminish at least a portion of the rendering of the physical scene.

Example 33 may include the subject matter of Example 31, wherein the manipulation of the physical scene comprises addition of a predefined physical object, and wherein dynamically modifying the rendering of the physical scene comprises applying one or more virtual articles to the rendering of the physical scene based upon the predefined physical object.

Example 34 may include the subject matter of any one of Examples 31-33, wherein dynamically modifying the rendering of the physical scene further comprises: receiving, by the computing device, color information and depth information associated with the physical scene; generating, by the computing device, a three dimensional (3-D) rendering of the physical scene from the color and depth information; identifying, by the computing device, a predefined physical object within the 3-D rendering of the physical scene; and applying, by the computing device, one or more virtual articles to the 3-D rendering of the physical scene or modifying one or more virtual articles added to the 3-D rendering of the physical scene, based on the identified predefined physical object and a context associated with the identified predefined physical object.

Example 35 may include the subject matter of Example 34, wherein receiving color information and depth information further comprises receiving a color image of the physical scene and a depth image of the physical scene.

Example 36 may include the subject matter of Example 35, wherein identifying the predefined physical object further comprises: analyzing, by the computing device, a plurality of surfaces within the physical scene utilizing the color image and the depth image to determine components of the physical scene that have connected continuity indicative of the components being a part of a single physical object; extracting, by the computing device, features of the single physical object for comparison against known features of a plurality of predefined physical objects; and comparing, by the computing device, the extracted features with features of the plurality of predefined physical objects to identify the single physical object as one of the plurality of predefined physical objects.

Example 37 may include the subject matter of Example 35, wherein the features of the plurality of predefined physical objects are contained in a database of predefined objects.

Example 38 may include the subject matter of Example 35, wherein one or more of the plurality of predefined objects are user defined physical objects.

Example 39 may include the subject matter of Example 35, wherein one or more of the plurality of predefined objects are defined by a third party.

Example 40 may include the subject matter of Example 35, further comprising defining, by the computing device, based on input from a user of the computing device, new physical objects to be added to the plurality of predefined physical objects.

Example 41 may include the subject matter of Example 34, wherein applying or modifying one or more virtual articles is further based on a context associated with the predefined physical object.

Example 42 may include the subject matter of Example 41, wherein the context associated with the predefined physical object corresponds with one or more of: a previous location of the predefined physical object in the physical scene; another predefined physical object within the physical scene; or one or more virtual articles previously applied to the physical object or the physical scene.

Example 43 may include the subject matter of Example 42, wherein the context associated with the predefined physical object corresponds with a previous location of the predefined physical object indicating movement, with respect to the physical scene, of the predefined physical object, and wherein dynamically modifying the 3-D rendering of the physical scene further comprises modifying one or more virtual articles based on the indicated movement.

Example 44 may include the subject matter of Example 43, wherein the context associated with the predefined physical object corresponds with another predefined physical object within the physical scene, and wherein dynamically modifying the 3-D rendering of the physical scene is further comprises modifying one or more virtual articles based on the another predefined physical object.

Example 45 may include the subject matter of Example 44, wherein the predefined physical object and the another predefined physical object are sub-tasks of a task to be completed by a user of the computing device, and wherein dynamically modifying the physical scene comprises augmenting the physical scene to aid the user in completing the task.

Example 46 is an apparatus for dynamically modifying a rendering of a physical scene comprising: means for detecting a manipulation of the physical scene from one or more images of the physical scene; and means for dynamically modifying the rendering of the physical scene, by applying one or more virtual articles to the rendering of the physical scene or altering one or more virtual articles added to the rendering of the physical scene, based on the manipulation.

Example 47 may include the subject matter of Example 46, wherein the one or more virtual articles augment or diminish at least a portion of the rendering of the physical scene.

Example 48 may include the subject matter of Example 46, wherein the manipulation of the physical scene comprises addition of a predefined physical object, and wherein means for dynamically modifying the rendering of the physical scene comprises means for applying one or more virtual articles to the rendering of the physical scene based upon the predefined physical object.

Example 49 may include the subject matter of any one of Examples 46-48, wherein means for dynamically modifying the rendering of the physical scene further comprises: means for receiving color information and depth information associated with the physical scene; means for generating a three dimensional (3-D) rendering of the physical scene from the color and depth information; means for identifying a predefined physical object within the 3-D rendering of the physical scene; and applying one or more virtual articles to the 3-D rendering of the physical scene or modifying one or more virtual articles added to the 3-D rendering of the physical scene, based on the identified predefined physical object and a context associated with the identified predefined physical object.

Example 50 may include the subject matter of Example 49, wherein means for receiving color information and depth information further comprises means for receiving a color image of the physical scene and a depth image of the physical scene.

Example 51 may include the subject matter of Example 50, wherein the means for identifying the predefined physical object further comprise: means for analyzing a plurality of surfaces within the physical scene utilizing the color image and the depth image to determine components of the physical scene that have connected continuity indicative of the components being a part of a single physical object; means for extracting features of the single physical object for comparison against known features of a plurality of predefined physical objects; and means for comparing the extracted features with features of the plurality of predefined physical objects to identify the single physical object as one of the plurality of predefined physical objects.

Example 52 may include the subject matter of Example 51, wherein the features of the plurality of predefined physical objects are contained in a database of predefined objects.

Example 53 may include the subject matter of Example 51, wherein one or more of the plurality of predefined objects are user defined physical objects.

Example 54 may include the subject matter of Example 51, wherein one or more of the plurality of predefined objects are defined by a third party.

Example 55 may include the subject matter of Example 51, further comprising means for defining new physical objects to be added to the plurality of predefined physical objects based on user input.

Example 56 may include the subject matter of Example 49, wherein applying or modifying one or more virtual articles is further based on a context associated with the predefined physical object.

Example 57 may include the subject matter of Example 56, wherein the context associated with the predefined physical object corresponds with one or more of: a previous location of the predefined physical object in the physical scene; another predefined physical object within the physical scene; or one or more virtual articles previously applied to the physical object or the physical scene.

Example 58 may include the subject matter of Example 57, wherein the context associated with the predefined physical object corresponds with a previous location of the predefined physical object indicating movement, with respect to the physical scene, of the predefined physical object, and wherein dynamically modifying the 3-D rendering of the physical scene further comprises modifying one or more virtual articles based on the indicated movement.

Example 59 may include the subject matter of Example 58, wherein the context associated with the predefined physical object corresponds with another predefined physical object within the physical scene, and wherein dynamically modifying the 3-D rendering of the physical scene is further comprises modifying one or more virtual articles based on the another predefined physical object.

Example 60 may include the subject matter of Example 59, wherein the predefined physical object and the another predefined physical object are sub-tasks of a task to be completed by a user of the computing device, and wherein means for dynamically modifying the physical scene comprise means for augmenting the physical scene to aid the user in completing the task.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the disclosure. This application is intended to cover any adaptations or variations of the embodiments discussed herein. Therefore, it is manifestly intended that the embodiments of the disclosure be limited only by the claims and the equivalents thereof.

What is claimed is:

1. A computing device comprising:
a display to render a physical scene;
one or more computing processors coupled with the display;
physical memory coupled with the one or more processors
a plane calculation module, to be loaded into the physical memory and executed by the one or more processors, to generate a rendering of the physical scene on the display, wherein the plane calculation module is to:
receive one or more indications of physical objects associated with the physical scene; and
based upon the received one or more indications, generate a rendering of the physical scene; and
a scene augmentation module, to be loaded into the physical memory and executed by the one or more processors, to aid in completion of a performance of a task, wherein the scene augmentation module is to:
detect a sub task of a manipulation of the physical scene by adding, moving, or removing a physical object in the scene, wherein at least one predefined physical object has an associated context relating to the sub task of the task;
dynamically modify the rendering of the physical scene, through real-time application of one or more virtual articles to the rendering of the physical scene or alteration of one or more virtual articles added to the rendering of the physical scene, based on the manipulation, wherein the modification of the rendering is to aid a user in completing the performance of the task; and
upon completion of the performance of the task, dynamically modify the rendering of the physical scene through real-time application of a virtual article to interact with a rendering of a physical object related to the completion of the performance of the task, wherein the interaction indicates the completion of the task.

2. The computing device of claim 1, wherein the rendering of the physical scene is a three dimensional, 3-D, rendering; and
wherein to dynamically modify the rendering of the physical scene further comprises to:
identify a predefined physical object within the 3-D rendering of the physical scene; and
apply one or more virtual articles to the 3-D rendering of the physical scene or alter one or more virtual articles added to the 3-D rendering of the physical scene, based on the identified predefined physical object.

3. The computing device of claim 2, wherein color information is contained within a color image of the physical scene and depth information is contained within a depth image of the physical scene and wherein the computing device further comprises an image processing module coupled with the scene augmentation module to align the color information and the depth information for further processing.

4. The computing device of claim 3, wherein to identify the predefined physical object, the scene augmentation module is further to:
analyze a plurality of surfaces within the rendering of the physical scene to determine surfaces of the rendering of the physical scene that have connected continuity indicative of the surfaces being a part of a single physical object;
extract features of the single physical object for comparison against known features of a plurality of predefined physical objects; and
compare the extracted features with features of the plurality of predefined physical objects to identify the single physical object as one of the plurality of predefined physical objects.

5. The computing device of claim 2, wherein to apply or alter one or more virtual articles is further based on a context associated with the predefined physical object.

6. The computing device of claim 5, wherein the context associated with the predefined physical object corresponds with one or more of:
a previous location of the predefined physical object;
another predefined physical object within the physical scene; or
one or more virtual articles previously applied to the physical object or the physical scene.

7. The computing device of claim 6, wherein the context associated with the predefined physical object corresponds with a previous location of the predefined physical object indicating movement, with respect to the physical scene, of the predefined physical object, and wherein to dynamically modify the 3-D rendering of the physical scene is to modify one or more virtual articles based on the indicated movement.

8. The computing device of claim 7, wherein the context associated with the predefined physical object corresponds with another predefined physical object within the physical scene, and wherein to dynamically modify the 3-D rendering of the physical scene is to modify one or more virtual articles based on the another predefined physical object.

9. The computing device of claim 1, wherein completing a task includes solving a puzzle or completing a computer-based learning exercise.

10. One or more non-transitory computer-readable storage media having instructions stored thereon which, when executed by a computing device, provide the computing device with a dynamic augmentation module to receive a manipulation of a physical scene, and in response to the receipt, dynamically modify a rendering of the physical scene, through real-time application of one or more virtual articles to the rendering of the physical scene or alteration of one or more virtual articles added to the rendering of the physical scene;
- wherein the manipulation of the physical scene comprises addition of a predefined physical object to the physical scene,
- wherein to dynamically modify the rendering of the physical scene comprises application of one or more virtual articles to the rendering of the physical scene based upon the predefined physical object, wherein at least one virtual article has an associated context relating to a sub task of a performance of a task, wherein the modification of the rendering is to aid a user in completing the performance of the task, and
- wherein upon completion of the performance of the task, application of the one or more virtual articles to a real-time interaction with a rendering of a physical object is related to the completion of the performance of the task, wherein the interaction indicates the completion of the task.

11. The one or more non-transitory computer-readable storage media of claim 10, wherein to dynamically modify the rendering of the physical scene, the dynamic augmentation module is further to:
- receive color information and depth information associated with the physical scene;
- generate a three dimensional, 3-D, rendering of the physical scene from the color and depth information;
- identify a predefined physical object within the 3-D rendering of the physical scene; and
- apply one or more virtual articles to the 3-D rendering of the physical scene or alter one or more virtual articles added to the 3-D rendering of the physical scene, based on the identified predefined physical object.

12. The one or more non-transitory computer-readable storage media of claim 11, wherein the color information is contained within a color image of the physical scene and the depth information is contained within a depth image of the physical scene.

13. The one or more non-transitory computer-readable storage media of claim 12, wherein to identify the predefined physical object, the dynamic augmentation module is further to:
- analyze a plurality of surfaces within the physical scene utilizing the color image and the depth image to determine components of the physical scene that have connected continuity indicative of the components being a part of a single physical object;
- extract features of the single physical object for comparison against known features of a plurality of predefined physical objects; and
- compare the extracted features with features of the plurality of predefined physical objects to identify the single physical object as one of the plurality of predefined physical objects.

14. The one or more non-transitory computer-readable storage media of claim 11, wherein to apply or alter one or more virtual articles is further based on a context associated with the predefined physical object.

15. The one or more non-transitory computer-readable storage media of claim 14, wherein the context associated with the predefined physical object corresponds with one or more of:
- a previous location of the predefined physical object;
- another predefined physical object within the physical scene; or
- one or more virtual articles previously applied to the physical object or the physical scene.

16. The one or more non-transitory computer-readable storage media of claim 15, wherein the context associated with the predefined physical object corresponds with a previous location of the predefined physical object indicating movement, with respect to the physical scene, of the predefined physical object, and wherein to dynamically modify the 3-D rendering of the physical scene is to modify one or more virtual articles based on the indicated movement.

17. The one or more non-transitory computer-readable storage media of claim 16, wherein the context associated with the predefined physical object corresponds with another predefined physical object within the physical scene, and wherein to dynamically modify the 3-D rendering of the physical scene is to modify one or more virtual articles based on the another predefined physical object.

18. A computer implemented method comprising:
- detecting, by a computing device, a manipulation of a physical scene from one or more images of the physical scene;
- receiving a color image and a depth image associated with the physical scene;
- generating a three dimensional, 3-D, rendering of the physical scene from color and depth information;
- identifying a predefined physical object within the 3-D rendering of the physical scene;
- applying one or more virtual articles to the 3-D rendering of the physical scene or altering one or more virtual articles added to the 3-D rendering of the physical scene, based on the identified predefined physical object and a context associated with the identified predefined physical object, wherein one or more virtual articles has an associated context relating to a sub task of a performance of a task, and wherein the applying or the altering one or more virtual articles is to aid a user in completing the performance of the task; and
- upon completion of the performance of the task, dynamically modifying the rendering of the physical scene through real-time application of a virtual article to interact with a rendering of a physical object related to the completion of the performance of the task, wherein the interaction indicates the completion of the task.

19. The method of claim 18, wherein identifying the predefined physical object further comprises:
- analyzing a plurality of surfaces within the physical scene utilizing the color image and the depth image to determine components of the physical scene that have connected continuity indicative of the components being a part of a single physical object;

extracting features of the single physical object for comparison against known features of a plurality of predefined physical objects; and comparing the extracted features with features of the plurality of predefined physical objects to identify the single physical object as one of the plurality of predefined physical objects.

20. The method of claim 19, wherein the context associated with the identified predefined physical object corresponds with one or more of:

a previous location of the predefined physical object in the physical scene;

another predefined physical object within the physical scene; or one or more virtual articles previously applied to the physical object or the physical scene.

21. The method of claim 18, wherein the context associated with the predefined physical object corresponds with another predefined physical object within the physical scene, the predefined physical object and the another predefined physical object being sub-tasks of a task to be completed by a user of the computing device, and wherein dynamically modifying the physical scene comprises augmenting the physical scene to aid the user in completing the task.

* * * * *

UNITED STATES PATENT AND TRADEMARK OFFICE
CERTIFICATE OF CORRECTION

PATENT NO. : 9,761,059 B2  
APPLICATION NO. : 14/269782  
DATED : September 12, 2017  
INVENTOR(S) : Kobi Nistel et al.

Page 1 of 1

It is certified that error appears in the above-identified patent and that said Letters Patent is hereby corrected as shown below:

In the Claims

Column 17  
Line 50, "...one or more processor"" should read – ...one or more processors;

Signed and Sealed this  
Twenty-first Day of November, 2017

Joseph Matal  
*Performing the Functions and Duties of the*  
*Under Secretary of Commerce for Intellectual Property and*  
*Director of the United States Patent and Trademark Office*